(No Model.)

I. B. POTTS.
DETACHABLE PIPE JOINT.

No. 407,681. Patented July 23, 1889.

Witnesses
John Bailey Johns.
Wm. H. Brereton

Isaac B. Potts  Inventor
By his Attorney
T. W. Tallmadge

UNITED STATES PATENT OFFICE.

ISAAC B. POTTS, OF COLUMBUS, OHIO.

DETACHABLE PIPE-JOINT.

SPECIFICATION forming part of Letters Patent No. 407,681, dated July 23, 1889.

Application filed March 25, 1889. Serial No. 304,752. (No model.)

*To all whom it may concern:*

Be it known that I, ISAAC BROADWORTH POTTS, a citizen of the United States, residing at Columbus, in the county of Franklin and State of Ohio, have invented a new and useful Improvement in Detachable Pipe-Joints, of which the following is a specification.

My invention is an improvement in adjustable pipe joints or couplings; and my said invention consists in certain details of construction and arrangement of the parts composing the same, as and for the purposes as will be hereinafter more fully described, and form the subject-matter of the annexed claims.

The object of this invention is to provide a joint or coupling for pipe that will permit of a certain amount or degree of flexure or change in the line or direction of the pipe; and to accomplish this result I proceed as follows, reference being had to the accompanying drawings, wherein—

Figure 1:
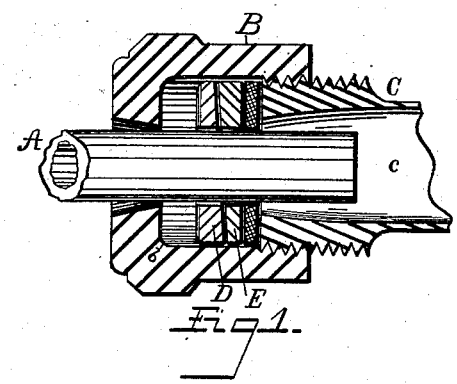
Figure 2:
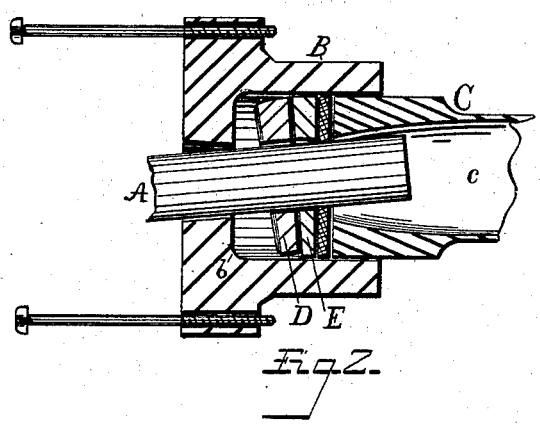
Figure 3:
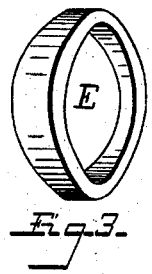
Figure 4:
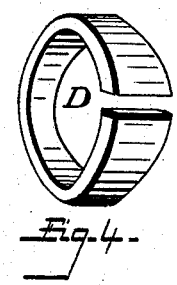

Figures 1 and 2 are views in central longitudinal sectional elevation of an adjustable pipe-joint constructed according to my invention, and Figs. 3 and 4 detail detached views of the rings to effect the change in the line of pipe.

A represents the end of the pipe being coupled, and B the coupling, which may be composed of screw-threaded members, as in Fig. 1, or of two flanged heads secured upon the union by through-bolts, as in Fig. 2.

C is the union, into which the ends of the pipe to be united or coupled are inserted, and the interior of this union is enlarged, as at c, for the purposes as will presently appear.

To connect the ends of the pipe, and at the same time permit the sections of pipe to be at different angles from each other, I proceed as follows: Upon the pipe to be coupled is first placed the two rings D and E. The ring D is, as shown in Fig. 3, split and made narrower upon one side than upon the other. The ring E is similarly formed, but is not split, and each ring upon one edge is straight. This straight edge of the ring D is made slightly curved or rounded, so as to accurately fit the seat b in the coupling-head B, which seat is also made curved, for the purposes as will presently appear. After the rings D and E are slipped upon the pipe being coupled the end of said pipe is slipped through the coupling-nut and into the union. A packing is now interposed between the end of the union and ring E, whereupon upon securing the coupling-nut and union together, either by bolts, as in Fig. 2, or screw-threads, as in Fig. 1, the rings D and E are forced together and upon the packing at the end of the union, and at the same time the split ring is compressed around the pipe, thus tightly securing the parts together. Now, to change the line of direction or angularity of the two ends of pipe being coupled, the ring D is turned around, so as to bring the wide part thereof opposite the wide part of the ring E, as in Fig. 2, when the line of pipe is changed from a straight line, as in Fig. 1, to an angle, as in Fig. 2, which angle may be of more or less degree, according to the amount of turn or position of the ring D relative to the ring E.

The chamber or enlargement c in the union C permits the movement of the inner end of the pipe when changing the line of the same from straight to angular, and, because of the rounded outer edge of the ring D and correspondingly-rounded seat in the coupling-nut, a proper bearing is provided for these parts, which would not be the result were the seat in the nut and edge of ring D flush.

I claim as my invention—

1. In an adjustable pipe-joint, in combination with the heads or coupling-nuts and interposed union of the rings D and E, tapering in the direction of the length of the pipe, one edge of each ring being straight and their abutting edges tapered or thicker upon one side than the other and the ring D split, substantially as described.

2. The combination, in an adjustable pipe-coupling, with the union or connected pipe end and coupling nut or head having a seat whose edge is curved, of the rings D and E, tapered in the direction of the length of the pipe; the ring D split and with rounded edge.

3. The combination, in an adjustable pipe-coupling, with the coupling nut or head, and rings D and E, tapered in the direction of the length of the pipe, of the union C, having recess c.

4. The combination, in an adjustable pipe-coupling, with the coupling nuts or heads and interposed union with recess in its interior, of the rings D and E, tapered in the direction of the length of the pipe, and packing interposed at the end of the union, substantially as described.

ISAAC B. POTTS.

In presence of—
 WM. H. BRERETON,
 HARVEY S. W. DE GAW.